United States Patent [19]
De Feo et al.

[11] 3,860,101
[45] Jan. 14, 1975

[54] SYNCHRONOUS CLUTCH ASSEMBLY FOR A TRANSMISSION DEVICE

[75] Inventors: Angelo De Feo, Totowa; Edward F. Drewniany, Oradell, both of N.J.

[73] Assignee: Curtiss-Wright Corporation, Wood-Ridge, N.J.

[22] Filed: Oct. 26, 1973

[21] Appl. No.: 409,919

[52] U.S. Cl............ 192/53 F, 192/53 G, 192/87.17
[51] Int. Cl............................................. F16d 23/06
[58] Field of Search.... 192/53 R, 53 F, 53 G, 87.17

[56] References Cited
UNITED STATES PATENTS

| | | | |
|---|---|---|---|
| 2,389,490 | 11/1945 | Dugas | 192/53 F |
| 2,397,943 | 4/1946 | Bull | 192/53 F |
| 2,410,511 | 11/1946 | Letsinger et al. | 192/53 F |
| 2,930,462 | 3/1960 | Willis | 192/53 F |
| 3,048,247 | 8/1962 | Cook et al. | 192/53 G |
| 3,369,639 | 2/1968 | Steinhagen | 192/87.17 |
| 3,424,285 | 1/1969 | McRay | 192/87.17 X |

FOREIGN PATENTS OR APPLICATIONS

| | | | |
|---|---|---|---|
| 380,758 | 9/1932 | Great Britain | 192/53 G |

*Primary Examiner*—Allan D. Herrmann
*Attorney, Agent, or Firm*—Arthur Frederick

[57] ABSTRACT

The synchronous clutch assembly for alternately effecting rotative connection of two concentrically arranged rotary input members to an output member comprises a loading means coacting with a double-acting piston-cylinder mechanism. The mechanism is connected to rotate said output member and to linearly reciprocate to positions for effecting alternate connection with each of the input members. The loading means alternately coacts with each of said input members for rotatively synchronizing the input member to be connected to the output member with the output member prior to drivable connection of the mechanism with the input member to be connected.

4 Claims, 9 Drawing Figures

SYNCHRONOUS CLUTCH ASSEMBLY FOR A TRANSMISSION DEVICE

This invention relates to rotary transmission devices and more particularly to a synchronous clutch assembly. The invention herein described was made in the course of or under Contract No. 1-35536 with the Maritime Administration and the Government is licensed under the patent and has reserved the rights set forth in Sections 1(f) and 1(g) of the Oct. 10, 1963 Presidential Statement of Government Patent Policy.

BACKGROUND OF THE INVENTION

In rotary transmission devices such as gear trains which transmit rotation from an input member driven by a prime mover to an output member, it is frequently necessary to employ a synchronous clutch assembly or gear coupling to provide for transmission of torque loads of increasing value from the input member to the output member until full torque transmission is achieved. A gear coupling of such type is exemplified in the U.S. Patent to Sigg, No. 3,709,343. The complexity of the conventional synchronous clutch assemblies and their size increases appreciably when the transmission device has two concentric input members which rotate in opposite directions. In such conventional clutch assemblies which are hydraulically actuated, the assemblies require a plurality of piston-cylinder mechanisms coacting with plural multi-friction clutch elements. Also, they may, because of the lack of "feed-back," fail to engage and require recycling to achieve engagement.

Accordingly, it is an object of this invention to provide a synchronous clutch assembly for a transmission device having two concentrically arranged input members and a single output member which is relatively simple in construction and in which recycling is eliminated.

Another object of the present invention is to provide a synchronous clutch assembly for a transmission device which is capable of rotating an output member in opposite directions via two concentrically arranged rotatively driven input members and a single rectilinear motor means.

SUMMARY

Accordingly, the present invention contemplates a novel synchronous clutch assembly for a transmission device, such as a planetary gear speed reducer, having dual, concentric, rotatively driven first and second input members, such as the ring gear and the planetary gear carrier of a planetary gear speed reducer, connected to be alternately driven in opposite directions by a prime mover, such as a gas turbine engine, and having an output member, such as a propeller, to be alternately rotated in such opposite directions. The synchronous clutch assembly comprises a first spline means on said first and second input members and a switch means having second splines adapted to mesh with said first splines. The switch means, including a rectilinear, hydraulically actuated motor means, as for example a double-acting piston-cylinder mechanism, is supported for rotation and axial movement relative to the first and second input members. In one position of the switch means the second spline means meshes with the first spline means of one of the first and second input members and in the other position meshes with the first spline means of the other first and second input members to effect rotation of the output member in the opposite direction. The switching is preferably accomplished when the input members are rotatively disconnected from the prime mover by suitable brake means, such as disclosed in copending patent application, Ser. No. 402,295 filed Oct. 1, 1973 and assigned to the same assignee as this invention. This disconnection of the input members from the prime mover minimizes the rotating inertia involved in effecting synchronization of the first and second splines before bringing them into meshing relationship.

A feature of this invention is the plurality of circumferentially spaced detents carried by the motor means and which coact with a clutch pack actuator or shuttle to engage a slip-clutch member and thereby impose a torque load or drag on the shuttle to cause the shuttle to rotate to a position to insure proper abutment of blocker splines prior to applying through the shuttle the full force on the slip-clutch member necessary to accelerate an input member to match that of the output member prior to moving the second spline means into mesh with the first spline means of the input member to be connected.

DESCRIPTION OF THE DRAWINGS

The above and other objectives and advantages of the present invention will appear more fully hereinafter from a consideration of the detailed description which follows when taken together with the accompanying drawings wherein one embodiment of the invention is illustrated and in which.

DESCRIPTION OF A PREFERRED EMBODIMENT

Figure 1:
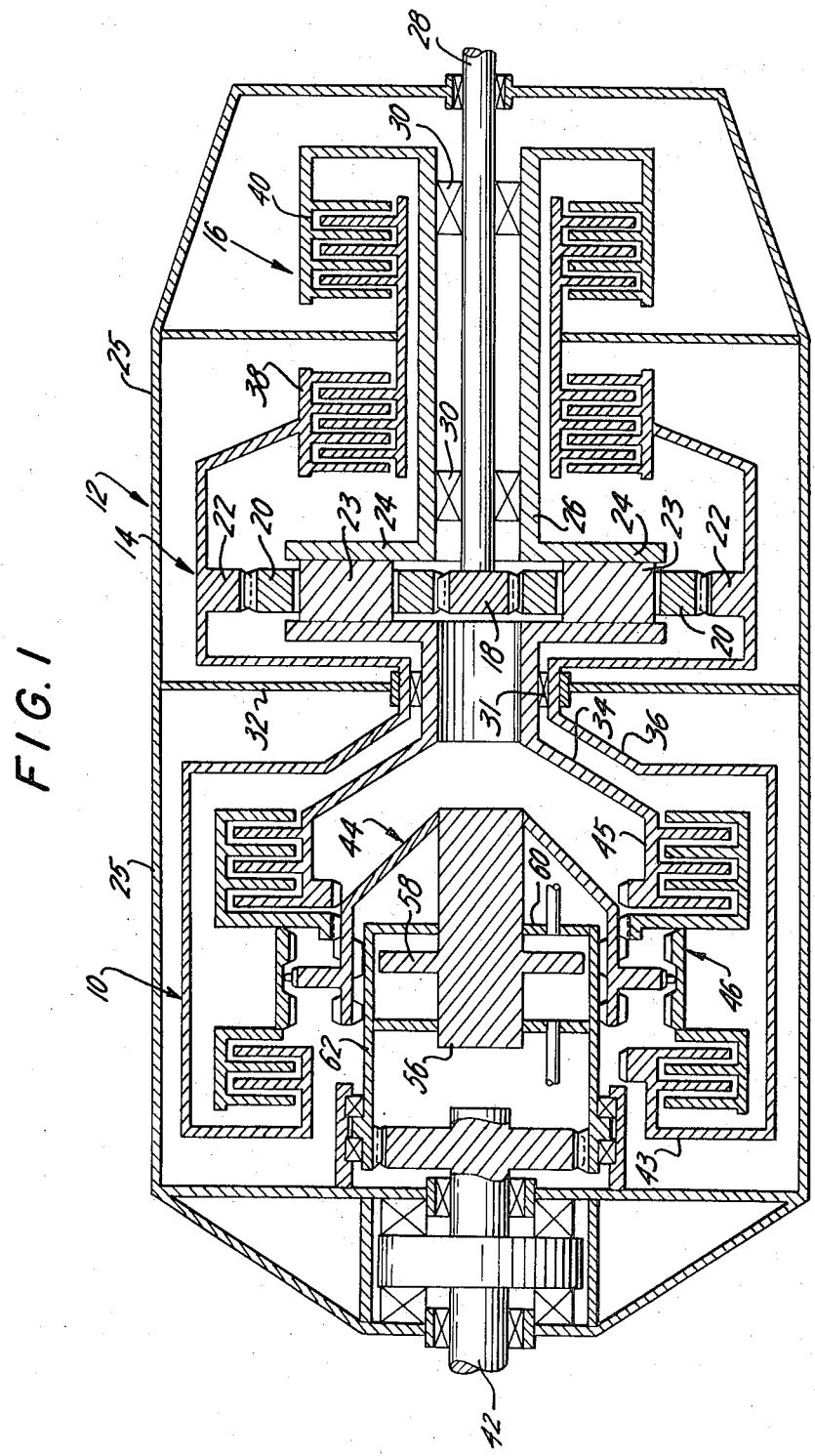
FIG. 1 is a schematic illustration of the synchronous clutch assembly according to this invention for a rotary transmission device.
Figure 2:
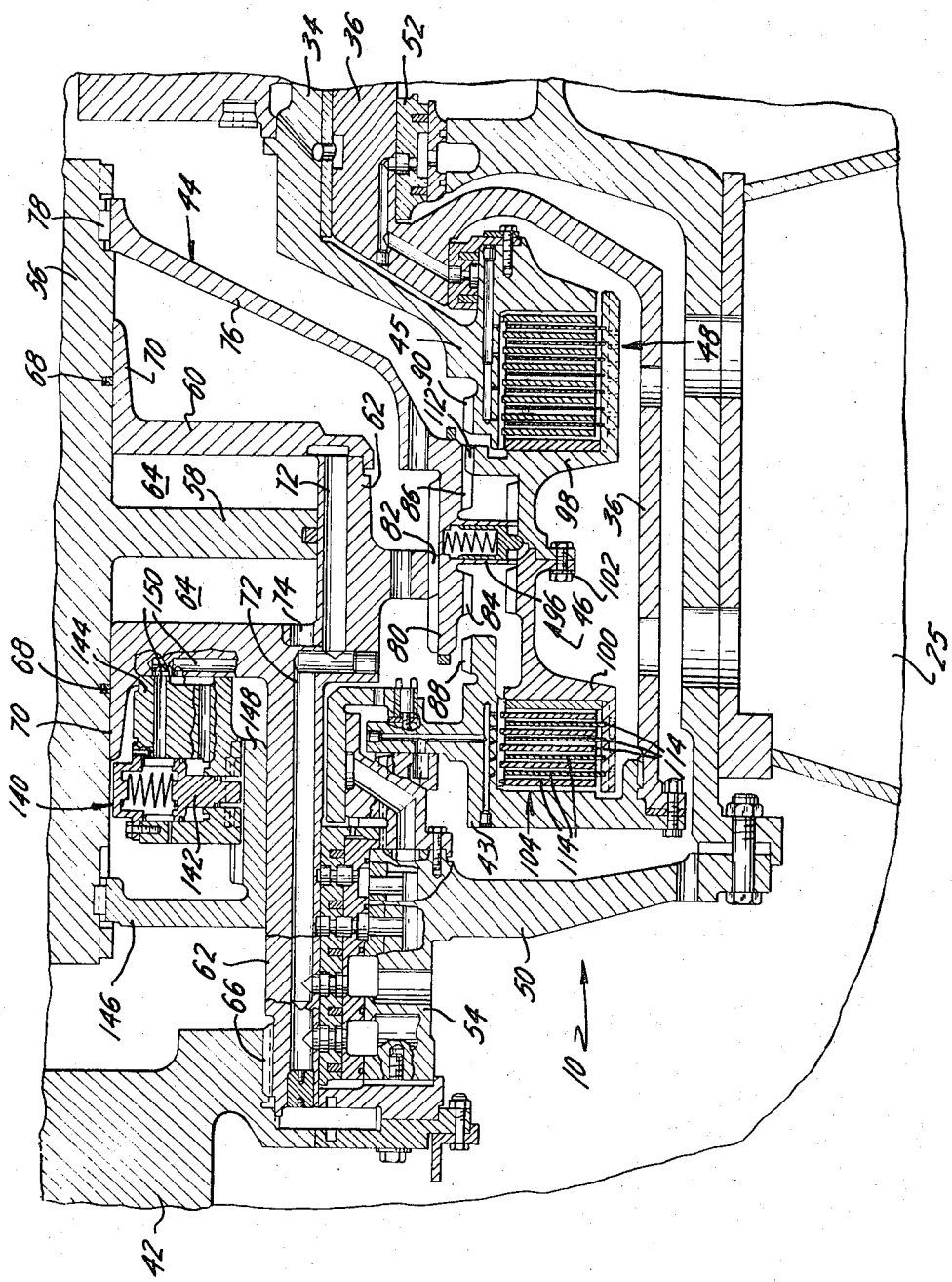
FIG. 2 is a fragmentary cross-sectional view of the synchronous clutch assembly shown schematically in FIG. 1.
Figure 3:
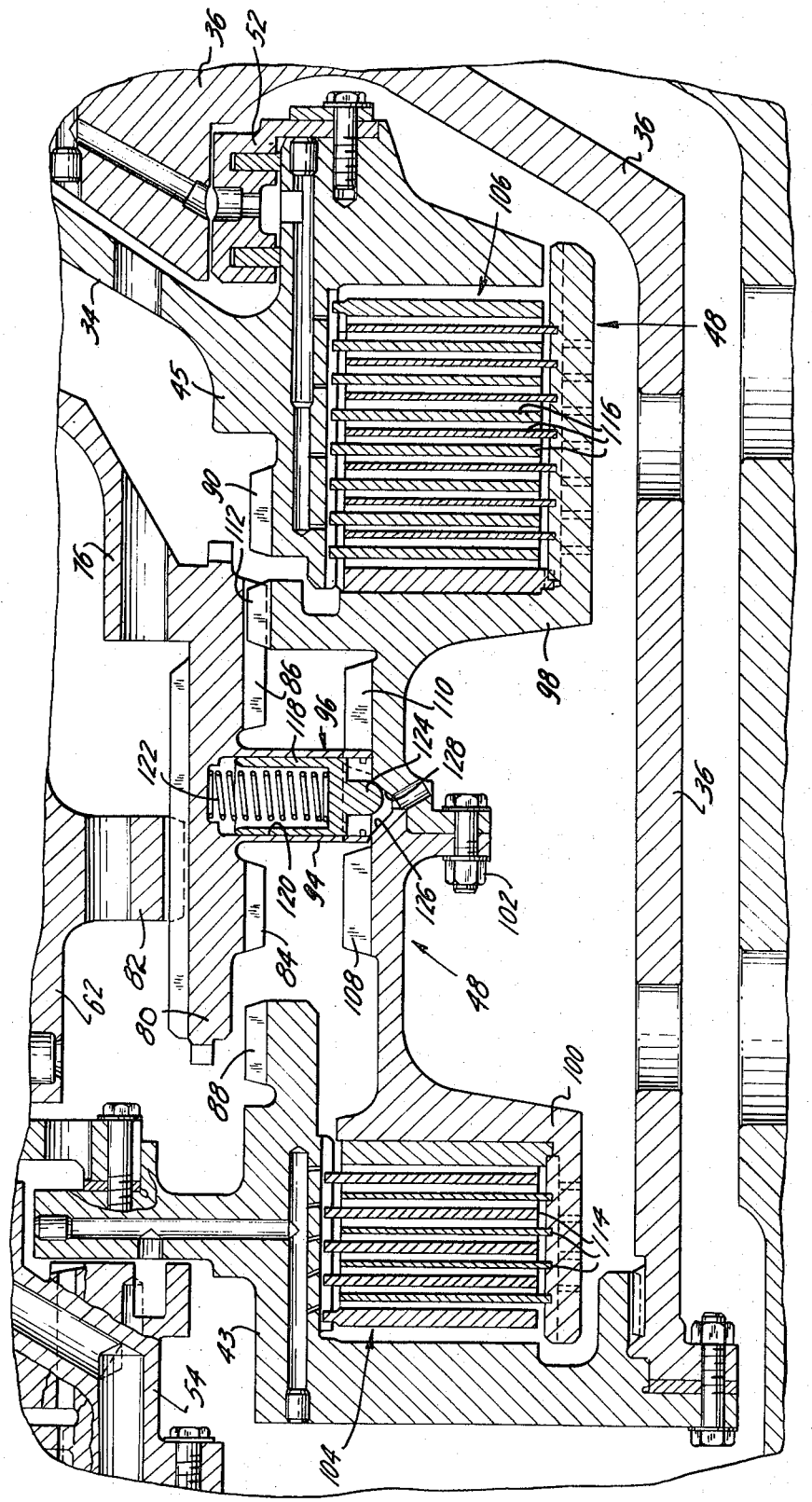
FIG. 3 is an enlarged fragmentary view of the shuttle and slip clutches of the synchronous clutch assembly.

Now referring to the drawings and more particularly to FIGS. 1 and 2, reference number 10 generally designates the synchronous clutch assembly according to this invention shown as part of a rotation transmission device 12 having a planetary gear speed reducer 14 and a brake assembly 16. While synchronous clutch assembly 10 is shown and will be described as coacting with a planetary gear speed reducer and brake assembly, such as of the type disclosed in the aforesaid pending U.S. patent application Ser. No. 402,295 filed Oct. 1, 1973, the invention is not limited to such combination, but has application to any transmission device having dual, concentric input members driven by a prime mover.

The planetary gear speed reducer 14 comprises a sun gear 18, and a plurality of circumferentially spaced planetary gears 20 disposed in mesh with the sun gear and an internal ring gear 22. The planetary gears are supported for rotation by posts 23 mounted on a carrier 24. The carrier, in turn, is supported for rotation in a housing or casing 25. The carrier 24 may have a tubular extension 26 which is supported at one end on an input or drive shaft 28, through bearings 30, while the opposite end is rotatively supported on bearings 31 on a pedestal 32 (schematically represented as a transverse wall in FIG. 1). The drive shaft 28 is connected to a prime mover (not shown), such as a gas turbine engine (not shown), to effect rotation of sun gear 18. The carrier 24 and ring gear 22 have connecting elements 34 and 36, respectively, which are alternately rotated by sun gear 18, depending upon whether the carrier or the ring gear is held against rotation by the brake assembly 16. The connecting elements 34 and 36, will hereinafter be referred to as a first input member and a second input member, respectively, which, as shown both in FIGS. 1 and 2 are concentrically supported relative to each other.

The brake assembly 16 comprises two annular brake subassemblies 38 and 40 which are operable through actuating means (not shown) to alternately arrest rotation of ring gear 20 or carrier 24, respectively. This alternate braking of the ring gear and the carrier provides for opposite rotation of first and second input members 34 and 36. To transmit the rotation of first and second input members 34 and 36 to an output member 42, which may be a shaft connected to drive a propeller (not shown), synchronous clutch assembly 10, according to the present invention is disposed within casing 25 and connected to first and second input members 34 and 36. The second input member 36 has an axial extension which is radially offset from the first input member 34 so as to provide an end portion 43 which is axially spaced from the end portion 45 of first input member 34, a portion of the assembly 10 lying between end portions 43 and 45.

The synchronous clutch assembly 10, as shown in detail in FIGS. 2 to 5, comprises a switch means, including a double-acting piston-cylinder mechanism 44, and a torque loading means, including a shuttle 46 and a slip-clutch means 48. The assembly 10 is supported for rotation within casing 25 by a fixed support structure 50 and two conventional oil transfer sleeves or no-load bearings 52 and 54 which function to effect transfer of oil from the stationary support structure 50 and rotating parts of assembly 10.

The double-acting piston-cylinder mechanism 44 has a piston consisting of an elongated cylindrical body portion 56 and an annular radially extending head portion 58 which serves to provide pressure surfaces. The piston is supported for reciprocation relative to a cylinder structure which has two axially spaced, annular walls 60 and an axial extension 62. The annular walls 60 and extension 62 define therebetween a working chamber 64 within which head portion 58 reciprocates. The axial extension 62 is supported for rotation in no-load bearing 54 and is spline connected at 66 to output shaft or member 42 for conjoined rotation with the latter. Suitable seals 68 are provided between annular flanged portions 70 of walls 60. Also, suitable passageways 72 and 74 are provided to conduct pressurized fluid, such as oil, through no-load bearing 54 to and from working chamber 64 whereby head portion 58 is reciprocated in working chamber 64. Through suitable valving, passageways 72 and 74 serve both as pressurized fluid supply conduits and return conduits, the supply conduit becoming a return conduit when pressurized fluid is introduced into the working chamber on the opposite side of piston head 58. The piston includes a drive coupling or switch element 76 keyed at 78 to body portion 56. The switch element 76 has an annular radially extending portion and a distal end portion 80 which extends axially between portions 45 and 43 of first and second input members 34 and 36. The switch element 76 is spline connected at 82 to extension 62 of the cylinder structure so that switch element 76 is rotatable with extension 62 and output member 42 and is axially reciprocable relative to the extension and output member when the piston is reciprocated. The switch element 76 is provided with axially spaced external splines 84 and 86 which are adapted alternately to engage internal splines 88 and 90 which are provided on the respective end portions 43 and 45. Thus, by axial reciprocative movement of switch element 76, drivable connection of output member 42 can be shifted from first input member 34 to second input member 36 and vice versa. The output member 42 is always in drivable connection with either the first or the second input member, there being no neutral position. The switch element 76 also has a set of blocker splines 92 which are externally arranged on the periphery of an annular, radial extension 94 projecting between splines 88 and 90. Also carried by switch element 76 in extension 94 are a plurality of circumferentially spaced detent assemblies 96 which coact with shuttle 46 to engage clutch means 48 as will be more fully explained hereinafter.

The shuttle 46 is an annular member comprising two portions 98 and 100 bolted together at 102 and supported for axial movement, through clutch packs 104 and 106 of slip clutch means 48, on end portions 45 and 43 of first and second input members 34 and 36. The shuttle 46 has two sets of axially spaced internal blocker splines 108 and 110 which coact with external blocker splines 92 of switch element 76 of mechanism 44 to properly align splines 84 and 86 with splines 88 and 90 prior to their movement into meshing relationship as will be more fully discussed herein. In addition to blocker splines 108 and 110, shuttle 46 has internal splines 112 which are adapted to mesh with splines 86 of switch element 76 and are axially so positioned relative to blocker splines 92, 108 and 110 that when the blocker splines are not in rotative engagement during a phase of reciprocative movement of switch element 76 splines 112 can be brought into mesh with splines 86 to thereby maintain the rotative interconnection of shuttle 48 with switch element 76.

In effecting a switching of the transmission of rotation to output member 42 from first input member 34 to second input member 36 and vice versa, it is necessary to synchronize the rotation of splines 86 and 90 and 82 and 88 prior to bringing the respective pairs of splines into mesh. This is accomplished by the clutch packs 104 and 106 of slip clutch means 48. The clutch pack 104, which may be referred to as the forward clutch pack, comprises a plurality of interjacent ring-shaped discs 114 which are alternately spline connected to shuttle portion 100 and end portion 43 of second input member 36. Similarly, clutch pack 106, which may be referred to as the reverse clutch pack, comprises a plurality of interjacent ring-shaped discs 116 in which alternate discs are connected to shuttle portion 98 and end portion 45 of first input member 34. The axial movement of shuttle 48 forces discs 114 together to thereby apply a torque load on second input member 36 while axial movement of shuttle 48 in the opposite direction forces discs 116 together to thereby apply a torque load on first input member 34. By applying a torque load on either the first or second input member as will be more fully explained, the first or the second input member is brought into substantial rotative coincidence with the output member 42.

Figure 4:
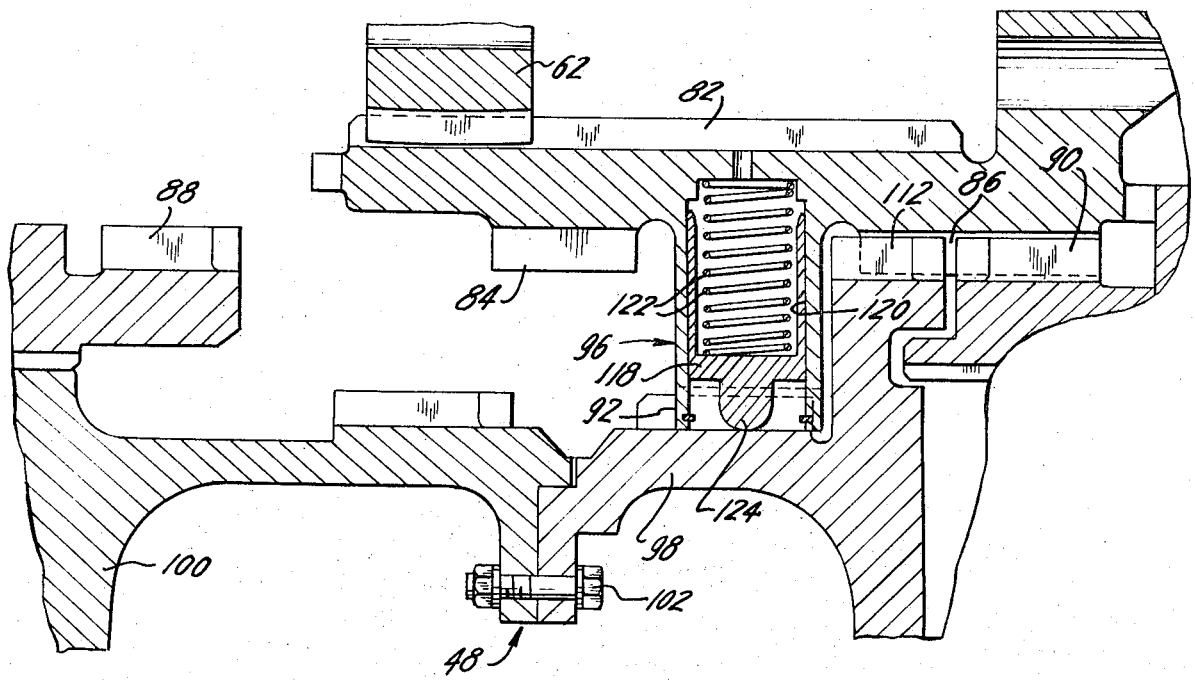
FIG. 4 is a fragmentary view of the shuttle on a larger scale than shown in FIG. 3 and in one of its fully engaged torque transmitting positions.
Figure 5:
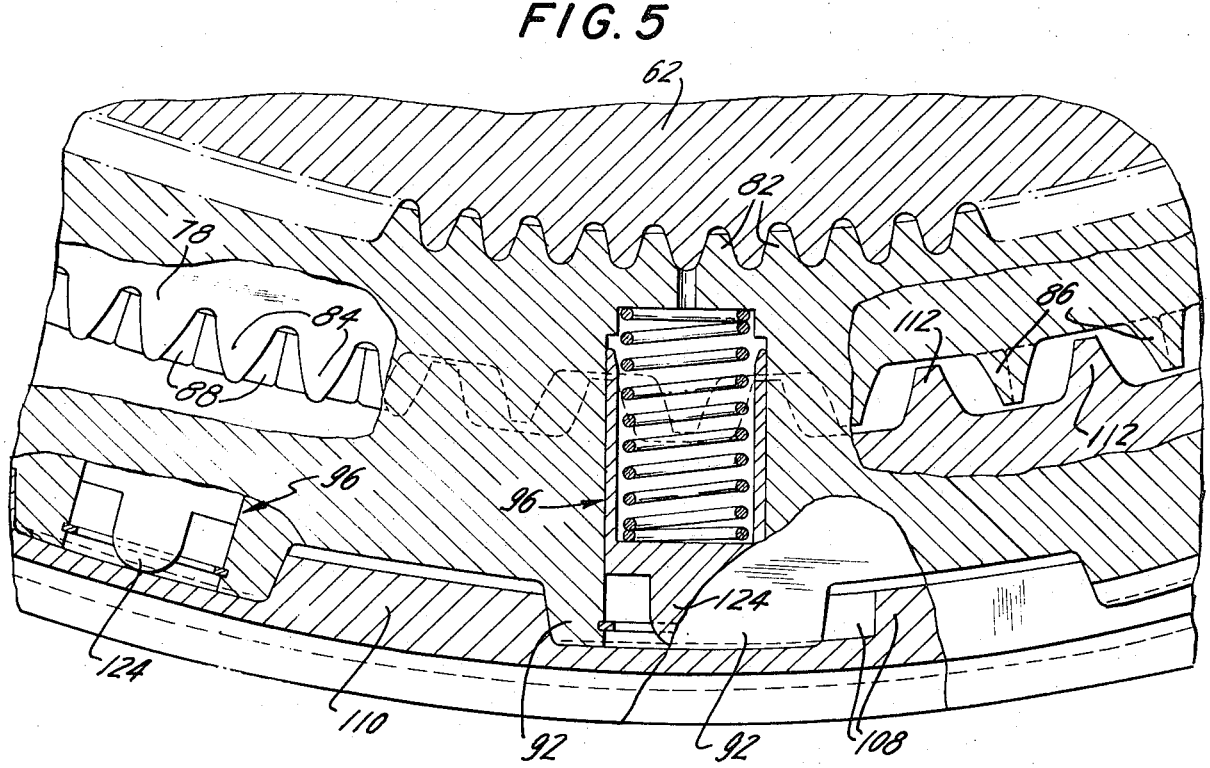
FIG. 5 is a cross-sectional view taken substantially along line 5—5 of FIG. 4.

As best shown in FIGS. 4 and 5, each of the detents 96 comprises a cylinder 118 which is slidably disposed in a bore 120 in extension 94 of end portion 80 of switch element 76. A spring 122 is disposed in bore 120 to bias cylinder 118 radially outward toward shuttle 48. The cylinder 118 has a teat-like portion 124 which is sized to fit within an annular camming groove 126 formed in shuttle 48.

The function of each of the detents 96 is to apply, upon reciprocative movement of switch element 76, a torque load or drag on shuttle 48. This torque force is achieved by reason of the engagement of teat-like portion 124 of each of the detents on the shuttle, the torque load diminishing as teat-like portions 124 ride down the inclined side walls 128 of camming groove 126 and increases again as it rides upwardly on the opposite inclined side wall 128. The springs 122 of each detent 96 resists the radial inward movement of cylinder 118. The detents 96 also function to provide an axial force on shuttle 48 when the teat-like portions 124 ride upwardly on the inclined surface 128 of groove 126. This axial force moves shuttle 48 against clutch pack 104 or 106, depending upon direction of such force and movement of shuttle 48, thereby bringing discs 114 or discs 116 into frictional engagement and applying an increased torque load or drag on the first or the second input member 34 or 36, respectively (again depending upon the direction of shuttle movement).

Figure 6:
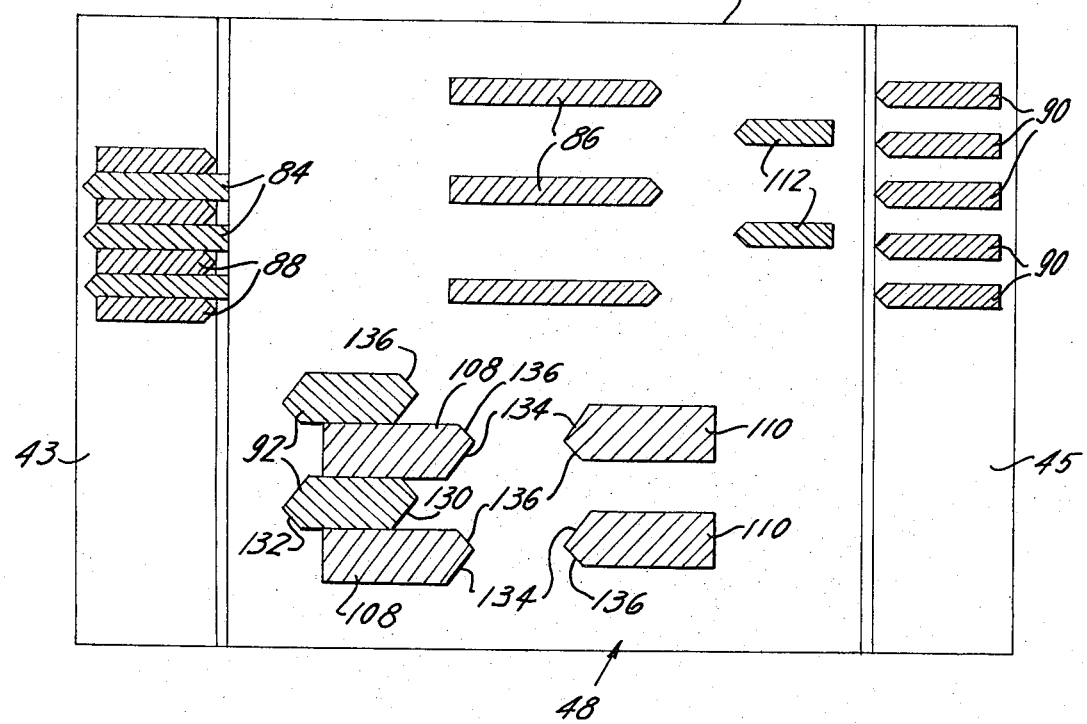
FIG. 6, 7, 8 and 9 are schematic views of the synchronous clutch assembly showing successive steps for switching from one torque transmitting position to the other.
Figure 7:
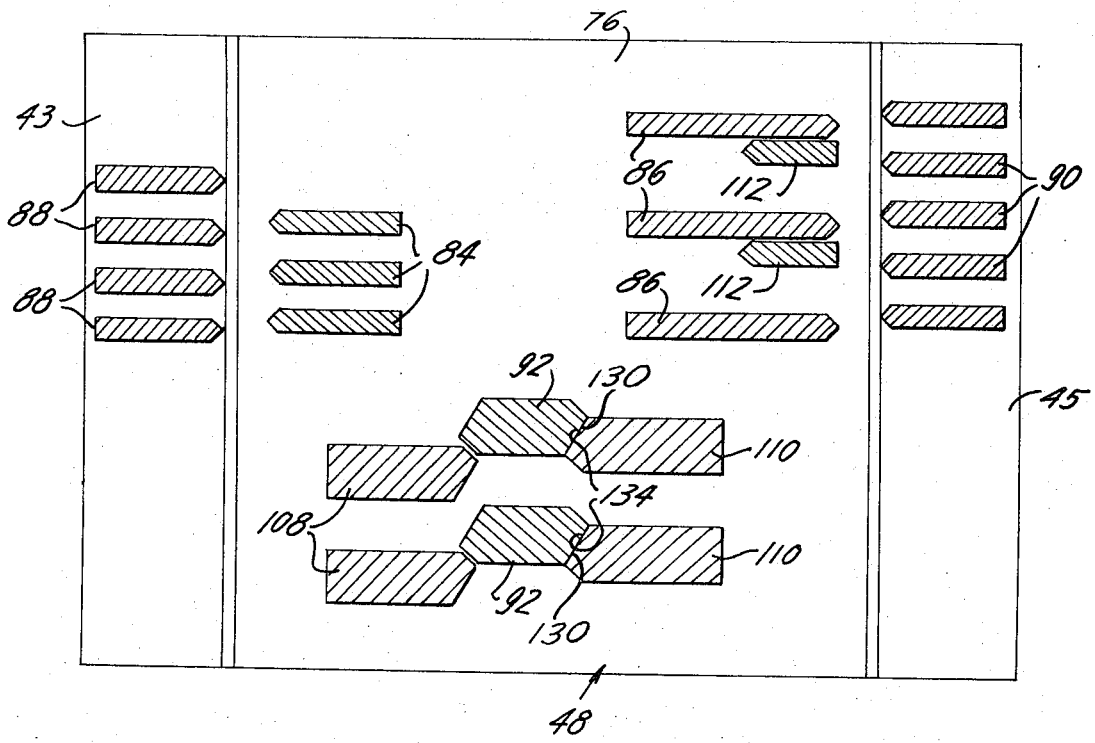
Figure 8:
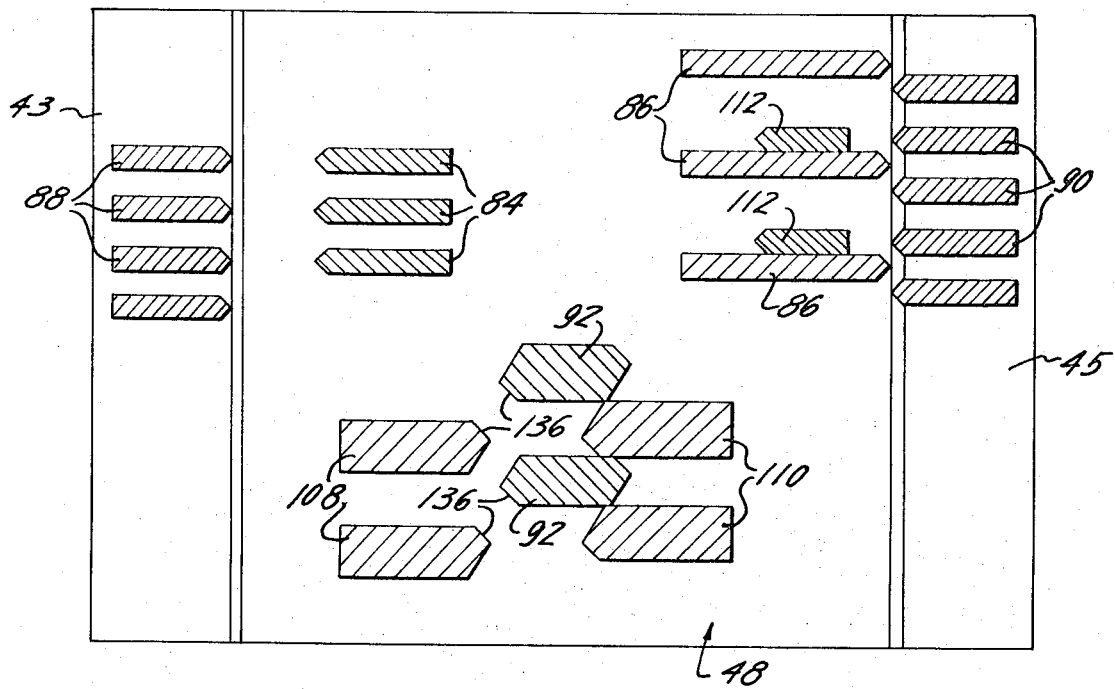

As is best shown in FIGS. 6 to 9, blocker splines 108 are circumferentially offset from blocker splines 110 so that upon axial movement of blocker splines 92, blocker splines 108 or 110 are in the line of travel of blocker splines 92. Also as shown, each of the blocker splines 92 have two inclined surfaces 130 and 132 at their opposite ends. These surfaces 130 and 132 are complementary to similar inclined or chamfered end portions 134 and 136 of splines 108 and 110. Since the interspace between blocker splines 108 and 110 is smaller than the length of splines 92, the abutment of the inclined surfaces of the splines is assured upon relative rotation of the blocker splines. These inclined surfaces function, when in abutment as shown in FIG. 7, to axially load shuttle 48 until the torque force on splines 108 and 110, which force acts counter to the torque force on splines 92 and thereby blocks further axial movement of switch means 76, reaches zero value. Thereafter, splines 92 rotate or tangentially move under the urging of the camming surfaces 130 or 132 of splines 92 riding against its complementary surface 134 or 136 of splines 108 or 110. In order to permit this tangential movement of switch element 76 relative to shuttle 48, splines 112 and 86 are in number half of the number of splines 88 and 90 on the end portions 43 and 45 of first and second input members 34 and 36. Thus, limited relative rotative movement between switch element 76 and shuttle 48 is permitted in both directions of travel of the shuttle by reason of the excess spacing between splines 112 and 86 (see FIG. 5). This tangential movement limited by the abutment of splines 112 and 86 as shown in FIG. 8 provides for automatically positioning splines 86 with respect to splines 90 in proper meshing alignment prior to such meshing. Likewise, in the opposite direction of movement of shuttle 48, the tangential movement limited by the abutment of splines 112 and 86 along their opposite sides provides for automatically aligning splines 84 for meshing with splines 88.

As shown in FIG. 2, mechanism 44 may be provided with a locking device 140 which functions to hold the piston and hence drive coupling or switch element 76 in one of its two positions. As shown and, if the synchronous clutch assembly 10 is part of a ship propulsion system, the device 140 serves to hold the piston and switch element 76 in the forward mode of operation (splines 80 and 88 in mesh), which, at sea, is sustained for days or weeks at a time. Thus, in the interest of economical operation, pressurized fluid for those long periods need not be constantly supplied to working chamber 64 to hold the piston in the selected position. The locking device 140 may be a pin 142 disposed for slidable, axial movement in a casing 144 and spring biased to engage the end edge 148 a cylindrical member 146 which is attached to move with the piston. The pin 142 is retracted to unlock the piston by the force of a pressurized fluid acting on the pin and introduced into casing 144 by suitable passageways 150.

The operation of synchronous clutch assembly 10 will be summarized with the assumption that it is employed in a gas turbine engine propulsion system for a marine vessel which system has a planetary gear speed reducer 14 and brake assembly 16 as shown in FIG. 1. With the synchronous clutch assembly 10 in the operative position where the piston and switch element 76 is located so that splines 82 and 88 are in mesh (as shown in FIG. 6, and when switch element 76 is in the lefthand position as viewed in FIGS. 2 and 3), the propulsion system will be assumed to be in the forward mode of operation. In this forward mode of operation, brake subassembly 40 (see FIG. 1) is engaged to prevent rotation of carrier 24 so that rotation of shaft 28 and sun gear 18 results in rotation of ring gear 22. The rotation of ring gear 22 is transmitted by second input means 36 to switch element 76 via meshing splines 84 and 88. With splines 84 and 88 in mesh, output member or shaft 42 is rotated in a direction to propel the ship forwardly. When it becomes desirable to slow or stop the forward motion of the ship or travel in a reverse direction, a suitable command signal is produced to immediately reduce the speed of the gas turbine engine (not shown) by reducing the fuel flow to the engine. Simultaneously, signals are directed to the brake assembly 16 to release brake subassembly 40 so that both carrier 24 and ring gear 22 are free to rotate and, hence, free of the inertia of gear 18, drive shaft 28, and the engine (not shown). Pressurized fluid, such as oil is then introduced, via appropriate passageways 150, to retract pin 142 of locking device 140 and thereby free the piston of mechanism 44 for movement. Thereafter, pressurized fluid is conducted, through appropriate passageways from a suitable source thereof, including passageway 74, to working chamber 64 so as to exert on piston head a force toward the right as viewed in the drawings.

Figure 9:
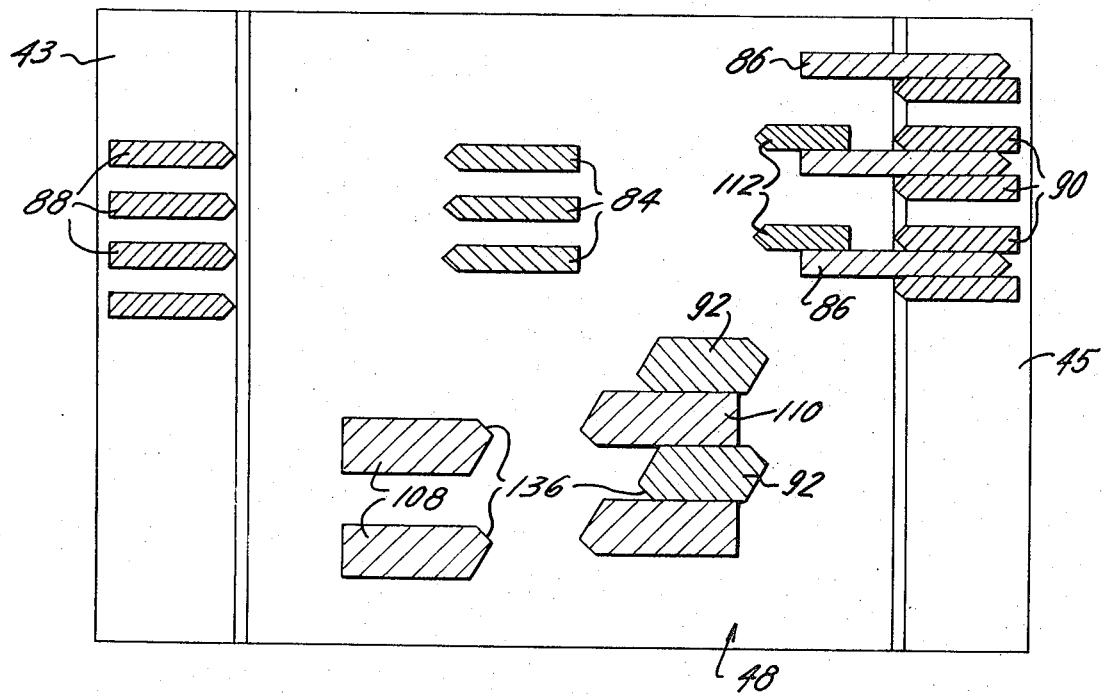

When the piston is actuated, blocker splines 92 which are carried by switching means 76 move to the right relative to meshing blocker splines 108 carried by shuttle 46. Also, simultaneously splines 84 of switch element 76 are moved relative to and out of meshing relationship with splines 88 carried by second input member 36. When switch element 76 has moved sufficiently to disengage blocker splines 92 from blocker splines 108 as shown in FIG. 7, splines 84 and 88 are out of engagement and slip clutch pack 104 has been released. At this time, each of the teats 124 of detents 96 engage the inclined side wall 128 at the bottom of annular groove 126 in shuttle 48 to thereby cause the shuttle to move with switch element 76. Even though blocker splines 92 and 108 are disengaged, the torque load on shuttle 48 provided by detents 96 rotates the shuttle 48 until shuttle splines 112 abut splines 86 of switch element 76 as shown in FIG. 7. Also, at this time blocker splines 92 are in abutment against blocker splines 110 at the respective chamfered surfaces 130 and 134. The torque load on splines 110, by reason of the rotative connection of splines 86 and 112 and the inertia of mechanism 44, output member and propeller (not shown), places a torque load on blocker splines 92 so as to keep surfaces 130 and 134 of blocker splines 92 and 110 in contact and thereby effects transmission of the axial thrust force of the piston of mechanism 44, through the blocker spline abutment, to shuttle 48. The axial thrust force on shuttle 48 compresses the discs 116 of clutch pack 106 thereby accelerating first input member 34 up to the speed of switch element 76 and shuttle 48. The instant that first input member 34 reaches the same speed as switch element 76 the reactive tangential force component resulting from the axial thrust force acting through the abutting inclined surfaces 130 and 134 of blocker splines 92 and 110, rotates switch element 76 until blocker splines 92 abut blocker splines 110 of shuttle 48, as is shown in FIG. 8. This now places splines 86 in proper meshing relationship to splines 92 on first input member 34. Thereafter, continued axial movement of switch element 76 brings splines 86 into mesh with splines 90 as shown in FIGS. 4 and 9; the carrier 24 now is drivably connected to output member 42. Following the connection of first input member 34, with output member 42, brake subassembly 38 is engaged to prevent rotation of ring gear 22. With ring gear 22 held against rotation, the rotation of sun gear 18 is transmitted, via carrier 24, to first input member 34 and thence to output member 42 and a propeller (not shown). Since the rotation is through carrier 24 instead of ring gear 22, the rotation is in the opposite direction which is an inherent characteristic of planetary gear assemblies.

If it is desired to restore forward mode operation, brake subassembly 38 is released and simultaneously pressurized fluid is conveyed to working chamber 64 of mechanism 44 to effect movement of piston head 58 to the left as viewed in the drawings. With initial axial movement of switch element 76, splines 86 are rotatively disengaged from splines 90. The shuttle 48 is maintained in rotative connection with switch means 76 through the meshing relationship of blocker splines 92 and 110. When blocker splines 92 are carried out of engagement with blocker splines 110, detents 96 engage inclined walls 128 at the bottom of annular groove 126 in shuttle 48 to thereby move the latter to the left as viewed in the drawings and impose a torque load on shuttle 48 through clutch pack 104. This causes blocker splines 92 to abut blocker splines 108 along the complementary inclined surfaces 132 and 136. Continued axial thrust by switch element 76 on shuttle 48, through abutment of blocker splines 92 and 108 and engagement of clutch pack 104, accelerates second input member 36 to the speed of switch element 76. When the speeds are synchronized, blocker splines 92 tangentially move relative to blocker splines 108 as blocker splines 92 ride on inclined surfaces 136 of blocker splines 108. Continued axial movement of switch element 76 brings blocker splines 92 and 108 into mesh simultaneously with carrying splines 84 into mesh with splines 88 of second input member 36. With second input member 36 and ring gear 22 rotatively connected to output member 42, via switch element 76, brake subassembly 40 is actuated to prevent rotation of carrier 24 and thereby restoring forward mode of propulsion.

It is believed now readily apparent that the present invention provides a novel synchronous clutch assembly capable of alternately connecting an output member to two concentrically arranged input members. It is relatively simple in construction since only one pressurized fluid actuated rectilinear motor means is required to effect such shifting. It is also an assembly wherein proper synchronous alignment of meshing drive splines is automatically achieved, thus eliminating the necessity for occasional recycling that conventional assemblies require.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. In a rotation transmission device having dual concentric rotatively driven first and second input members connected to be alternately driven in opposite directions by a prime mover and having an output member, the combination of a synchronous clutch assembly for alternately connecting said first and second input members to said output member, said synchronous clutch assembly comprising:

a. first splines on said first input member;
 second splines on said second input member spaced axially from said first splines;
 c. a switch means comprising:
  a-1. a double-acting piston-cylinder mechanism connected to rotate said output member and supported for reciprocative movement to two operative positions;
  b-1. said mechanism having third splines disposed to alternately mesh in the two operative positions with said first and second splines on said first and second input members;
  c-1. slip-clutch means for each of said first and second input members;
  d-1. a shuttle means disposed and supported for rotative and linear movement adjacent said first and second input members and having two axially spaced fourth and fifth splines;
  e-1. said mechanism being provided with sixth splines for alternately engaging said fourth and fifth splines of said shuttle means upon reciprocative movement of said mechanism;

f-1. said shuttle means being connected to said mechanism for conjoined rotation and linear movement relative to said mechanism to effect alternate engagement of said slip-clutch means of said first and second input members to thereby synchronize rotation of said output member and the input member to be connected thereto prior to said third splines meshing with the first or second splines associated with the input member to be connected.

2. The apparatus of claim 1 wherein said shuttle has seventh splines which mesh with the third splines of said mechanism to maintain rotative connection between the shuttle and said mechanism when said fourth and fifth splines are not in mesh.

3. The apparatus of claim 1 wherein said sixth splines of said mechanism have inclined end surfaces and said fourth and fifth splines of said shuttle means have inclined end surfaces which are engaged by inclined end surfaces of the sixth splines upon linear movement of said mechanism and thereby to provide a torque load through the engaged slip clutch means of the input member to be connected, the rotative inertia of the input member to be connected to bring the asociated first and second spline of the input member to be connected into rotative coincidence with said third splines.

4. The apparatus of claim 1 wherein said shuttle means has axially spaced fourth and fifth splines and said mechanism has a connecting means comprising:

a-2. fourth splines disposed to alternately engage and mesh with said fourth and fifth splines upon reciprocative linear movement of said mechanism;

b-2. a plurality of preloaded detents;

c-2. said shuttle means having annular inclined walls disposed to receive said detents so that an axial force is applied to said shuttle means upon reciprocative linear movement of said mechanism.

* * * * *